E. F. BROOKS.
Hand-Levers for Operating Regulating-Cocks for Gas and Water Pipes.
No. 150,518.                  Patented May 5, 1874.
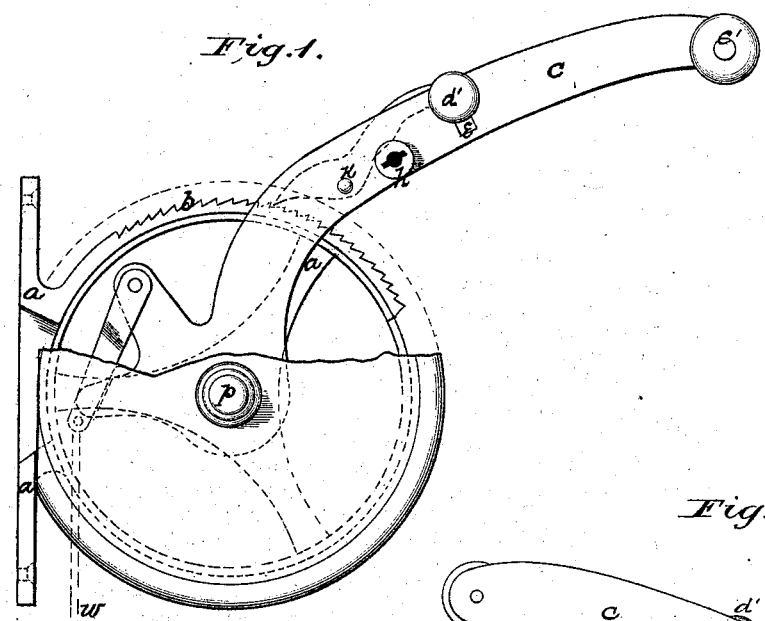
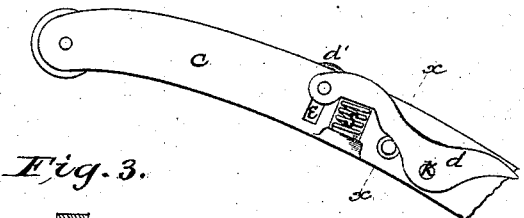
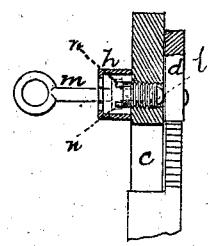
Witnesses.
G. B. Towles.
R. S. Whittlesy.
Inventor:
Edwin F. Brooks
by
A. C. Bradley
Attorney

UNITED STATES PATENT OFFICE.

EDWIN F. BROOKS, OF BALTIMORE, MARYLAND, ASSIGNOR OF ONE-HALF HIS RIGHT TO CHARLES E. SEAL, OF SAME PLACE.

IMPROVEMENT IN HAND-LEVERS FOR OPERATING REGULATING-COCKS FOR GAS AND WATER PIPES.

Specification forming part of Letters Patent No. 150,518, dated May 5, 1874; application filed March 17, 1874.

*To all whom it may concern:*

Be it known that I, EDWIN F. BROOKS, of the city of Baltimore, State of Maryland, have invented certain Improvements in Hand-Levers for Operating Regulating-Cocks for Gas and Water Pipes, of which the following is a specification:

This invention relates to the device patented to Charles E. Seal, July 1, 1873, by Letters Patent No. 140,549, reissued September 30, 1873, by reissued Letters Patent No. 5,585, for a "cut-off and regulating-cock for gas;" and it consists in applying a locking device to the hand-lever, so as to operate in combination with a dog in retaining the lever, and so holding the self-closing valve at any desired point; and its object is to prevent a certain regulating adjustment of the devices named from being tampered with or changed by careless handling.

In the drawing, Figure 1 is a front view of a hand-lever and its attachments with my invention applied, part of the external covering or casing being removed to more clearly show the working parts. Fig. 2 is a partial rear view of the lever and the dog, and Fig. 3 is a section of the same through the line *x x* of Fig. 2.

The same letters of reference are used in the several figures to indicate like parts.

*a* is the supporting-frame of the lever and attachments, cast with a ratchet, *b*, on the upper portion of its rim. *a'* is a protecting cover or casing, broken off partly in Fig. 1 to show the working parts of the lever. *c* is a bell-crank lever pivoted to the frame at *p*, provided with suitable arms and attachments, to which the connecting-wire *w* from the self-closing valve is secured, and a handle, knob, or button, *c'*. To its under side, as shown in Fig. 2, a dog, *d*, is pivoted by means of a pin, *k*, and it operates in the notches of the ratchet *b*. It is held down to the ratchet by means of a spiral spring, *s*, which rests upon a shoulder projecting from the lever for that purpose. A pin working in a slot, *e*, in the lever connects the dog with a button, *d'*. *l* is a screw-lock arranged in the lever *c*, as shown in the drawings, so that its bolt end will, when thrown, pass immediately below and against the dog, and thus prevent its being pressed down. It consists of a simple screw, provided with a rounded or bolt end for bearing against the dog, and its head has two ears, *n n*, against which two corresponding wings upon the key actuate in throwing and withdrawing the bolt. *h* is the outer lock-casing, which surrounds the screw-head and contains the key-hole.

It is apparent that, when unlocked, the lever *c* can be adjusted in one direction by mere pressure, while in the other direction its movement will require the lifting of the dog from the ratchet. The force of the spring of the self-closing valve will hold the lever to its position unless the dog is disturbed; but when the screw-bolt is thrown behind the dog the lever will be locked to its position.

I claim as my invention—

1. In a hand crank-lever for operating a self-closing valve, the combination of a locking device with a detaining-dog, for the purpose specified.

2. The combination of lever *c* with the spring-dog *d*, lock *l*, and ratchet *b*, substantially as described.

E. F. BROOKS.

Witnesses:
WM. H. FINCKEL,
A. C. BRADLEY.